United States Patent [19]
Lee et al.

[11] Patent Number: 5,276,690
[45] Date of Patent: Jan. 4, 1994

[54] APPARATUS UTILIZING DUAL COMPARE LOGIC FOR SELF CHECKING OF FUNCTIONAL REDUNDANCY CHECK (FRC) LOGIC

[75] Inventors: Phil G. Lee, Aloha; Eileen Riggs, Hillsboro, both of Oreg.

[73] Assignee: Intel Corporation, Santa Clara, Calif.

[21] Appl. No.: 830,209

[22] Filed: Jan. 30, 1992

[51] Int. Cl.⁵ .......................................... G06F 11/16
[52] U.S. Cl. ...................................... 371/3; 371/68.1; 395/575
[58] Field of Search ............... 371/3, 68.1, 22.3, 40.1, 371/37.8, 22.4, 49.2; 364/200; 395/2, 575; 360/15

[56] References Cited
U.S. PATENT DOCUMENTS

| | | | |
|---|---|---|---|
| 3,789,144 | 1/1974 | Doyle | 179/15.55 T |
| 4,107,649 | 8/1978 | Kurihara | 340/146.1 AG |
| 4,792,955 | 12/1988 | Johnson | 371/68.1 |
| 4,903,270 | 2/1990 | Johnson | 371/68.1 |
| 4,924,467 | 5/1990 | Criswell | 371/68.1 |

*Primary Examiner*—Robert W. Beausoliel, Jr.
*Assistant Examiner*—Joseph E. Palys
*Attorney, Agent, or Firm*—Owen L. Lamb

[57] ABSTRACT

An integrated circuit module in which an error detection circuit compares data generated internally on module with data generated externally from another substantially identical module. An error detect output is asserted upon the condition that data generated internally on module and data generated externally from module do not match. A circuit alters the internally generated data by injecting a zero bit and then a one bit data into the internally generated data to thereby generate altered data. Error anticipation control logic generates a test condition, which corresponds to the expected error condition caused by altered data, by first expecting to detect the effect of the injected zero bit and then expecting to detect the effect of the injected one bit. An error-0 comparison circuit compares the actual error detect output with expected error detect output for the zero bit. An error-1 comparison circuit compares the actual error detect output with expected error detect output for the one bit. An error output is asserted if the actual error detect output and the expected error detect output do not match in either of the two cases.

2 Claims, 3 Drawing Sheets

| FIG. 3A | FIG. 3B |
|---|---|

KEY TO FIG. 3

APPARATUS UTILIZING DUAL COMPARE LOGIC FOR SELF CHECKING OF FUNCTIONAL REDUNDANCY CHECK (FRC) LOGIC

BACKGROUND OF THE INVENTION

1. Field of the Invention

This invention relates to data processing systems, and more particularly, to means for continuously checking for failures in error checking logic.

2. Description of the Related Art

In U.S. Pat. No. 4,176,258 of Daniel Jackson, granted on Nov. 27, 1979 and assigned to Intel Corporation, detection of errors is accomplished by a redundancy method known as functional redundancy checking (FRC). In this method, an integrated circuit component is duplicated and output signals from the two identical components are compared in an FRC logic. An error condition is reported if the output signals do not match one another.

U.S. Pat. No. 4,792,955 of Johnson et al., granted on Dec. 20, 1988 and assigned to Intel Corporation, describes a way of recovering from an error detected by the FRC logic where one of the components is found to be faulty. This is done by splitting the components apart so that the faulty one is disengaged from the system and the operative one continues in use, but without the FRC checking capability.

In these prior circuits, if the FRC logic itself is not working correctly error conditions may go unreported. Because the FRC logic is what the system relies on to correctly identify errors, it is important that the FRC logic itself be tested during normal operation of the system. This need gave rise to U.S. Pat. No. 4,903,270 of Johnson et al., granted on Feb. 20, 1990 and assigned to Intel Corporation, which describes a redundant module checking system in which the error checking logic continuously performs a check on itself in order to ascertain that it is working correctly. This is accomplished by providing an integrated circuit module in which an error detection circuit compares data generated internally on the module with data generated externally from another substantially identical module. An error detect output is asserted upon the condition that data generated internally on module and data generated externally from module do not match. A circuit alters the internally generated data by injecting erroneous data into the internally generated data to thereby generate altered data. An error anticipation control logic generates a test condition, which corresponds to the expected error condition caused by the altered data. A comparison circuit compares the actual error detect output with the expected error detect output. An error output is asserted if the actual error detect output and the expected error detect output do not match. This circuit has the advantage that malfunctions in error detection circuitry can be detected during normal operation of the components. The disadvantage is that for some time the test circuitry could induce many other errors that could mask whether the FRC is working correctly.

It is an object of the invention to provide a circuit which is uniform across all pins being checked and that will check the checking circuitry but will not induce other errors that mask whether the FRC is working correctly.

It is a further object of the invention to provide a circuit that will check the output It is a further object of the invention to provide a circuit that will check the output pins of a chip to ensure that the output drivers actually drove the data presented to them.

SUMMARY OF THE INVENTION

Briefly, the above object is accomplished in accordance with the invention by providing an integrated circuit module having chip logic fabricated thereon said chip logic having a chip logic data output an error checking circuit comprising:

- a clock pulse source for generating a first clock pulse output each one-half cycle of a full clock cycle;
- an output pin;
- first compare circuit having a first input and a second input for first compare output upon the condition that said and second inputs do not match;
- a second compare circuit having a third input and a fourth input for providing a second compare output upon the condition that said third and fourth inputs do not match;
- an output buffer connected to said output pin and to said chip logic data output for providing an output signal to said output pin;
- said output buffer being activated by a drive enable;
- a delay circuit connected to said chip logic data output and to said first input of said first compare circuit and to said third input of said second compare circuit for delaying said chip logic data by one clock cycle to thereby provide a delayed chip logic data output at a delayed signal output of said delay circuit;
- means for connecting said output pin to said second input of said first compare circuit and to said fourth input of said second compare circuit; and,
- a shift register connected to said first clock pulse output for generating successively with each shift of said shift register a test left signal and one clock cycle subsequent to said test left signal a test right signal;
- said test left signal of said shift register means being connected to said first comparator to thereby inject an error signal into said first comparator;
- said test right signal of said shift register means being connected to said second comparator to thereby inject an error signal into said second comparator.

The invention has the advantage that one FRC/parity testing circuit can be replicated for all pins and eliminates the need for latent error testing modes in software.

BRIEF DESCRIPTION OF THE DRAWINGS

The foregoing and other objects, features, and advantages of the invention will be apparent from the following detailed description of a preferred embodiment of the invention as illustrated in the accompanying drawings wherein.

DESCRIPTION OF THE PREFERRED EMBODIMENT

The detection of errors at the output pins of two identical integrated circuit chips is done by Functional Redundancy Checking (FRC) logic which is present on both identical modules. The outputs of the modules are connected together, either by using tri-state drivers or they are wired OR. All of the self-checking logic and FRC checking logic is integrated on each module, so that only one part number need be manufactured. One of the pair of modules assumes the role of master, while the other module assumes the role of checker. The role (master/checker) of the pair is also swapped during operation, when the bus is idle. Both modules form a single logical module that is said to be FRC'd. The two modules run in lock step and at every step the checker module compares its outputted data with the corresponding data outputted by the master module to ensure that it has computed the same results as the master. If a disagreement is detected, then an error is signaled on the Error Reporting Line output of the checker module.

PRIOR ART

Figure 1:
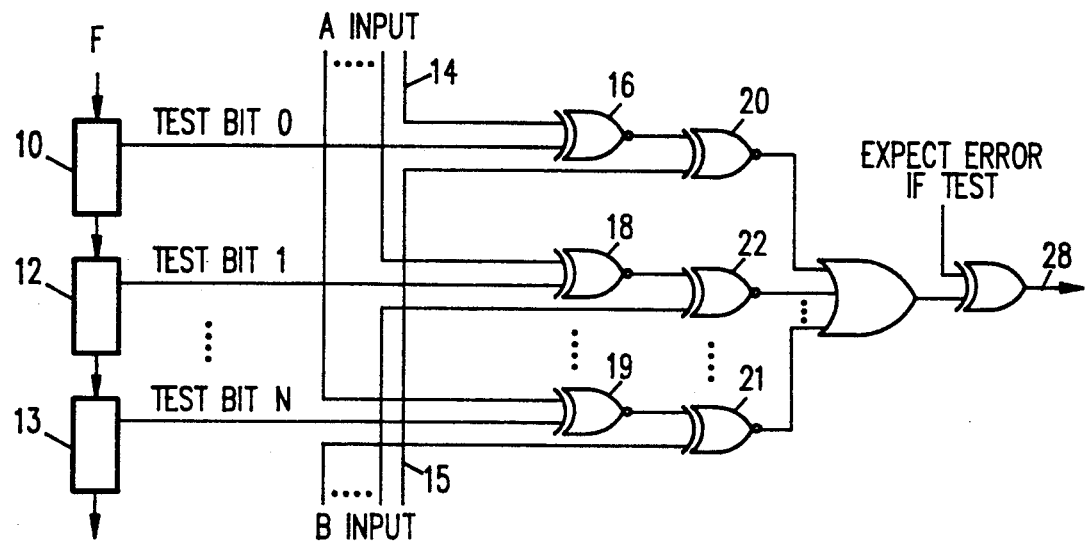
FIG. 1 is a diagram of a prior art functional redundancy checking.

The logic of FIG. 1 illustrates the prior art FRC logic which will be described for three bit lines on one of the modules, for simplicity and ease of understanding. Signal lines (A INPUT) from chip logic A and lines (B INPUT) from chip B are connected to duplicate logic tree. This allows one logic tree to have an injected error from a shift chain (10, 12, 13) and do a self-check while the other tree will not have an injected error and can perform the standard FRC check.

The output (A OUTPUT) is connected to exclusive NORs (16, 18). The outputs of the exclusive NORs (16, 18, 19) are connected to exclusive NORs (20, 22, 21).

The outputs of shift chain (10, 12, 13) drive exclusive NORs (16, 18, 19). The TEST BIT 0, TEST BIT 1, ... . TEST BIT N output provide a test pattern of one's and zeros corresponding to the expected error condition forced by the shift chain (10, 12).

The shift chain (10, 12, 13) is driven by an appropriate recurring frequency (F). The shift chain (10, 12, 13) shifts a bit from one stage of the shift chain to the next so that an error bit is successively injected into the FRC logic. A check can then be made by toggling a latch (30) to examine the ERROR DETECT outputs. That is, the erroneous bit injected into the FRC logic should cause an error condition to be asserted on an FRC error detect line (28) at the same time that the expected error condition is asserted on the EXPECT ERROR IF TEST line.

The shift chain on each module affects the value of one of the input lines (14, 15) at a time to force an error in that bit to test the FRC logic. Since this line is internally corrupted an FRC error should be indicated on the FRC error detect line (28) if the FRC logic is working correctly. If everything is functioning normally at the time an error condition is forced, the FRC error detect line (28) will indicate OK. All other conditions indicate a failure in the FRC logic itself, or a disagreement between the outputs of the chip logic A and chip logic B.

THE INVENTION

Figure 2:
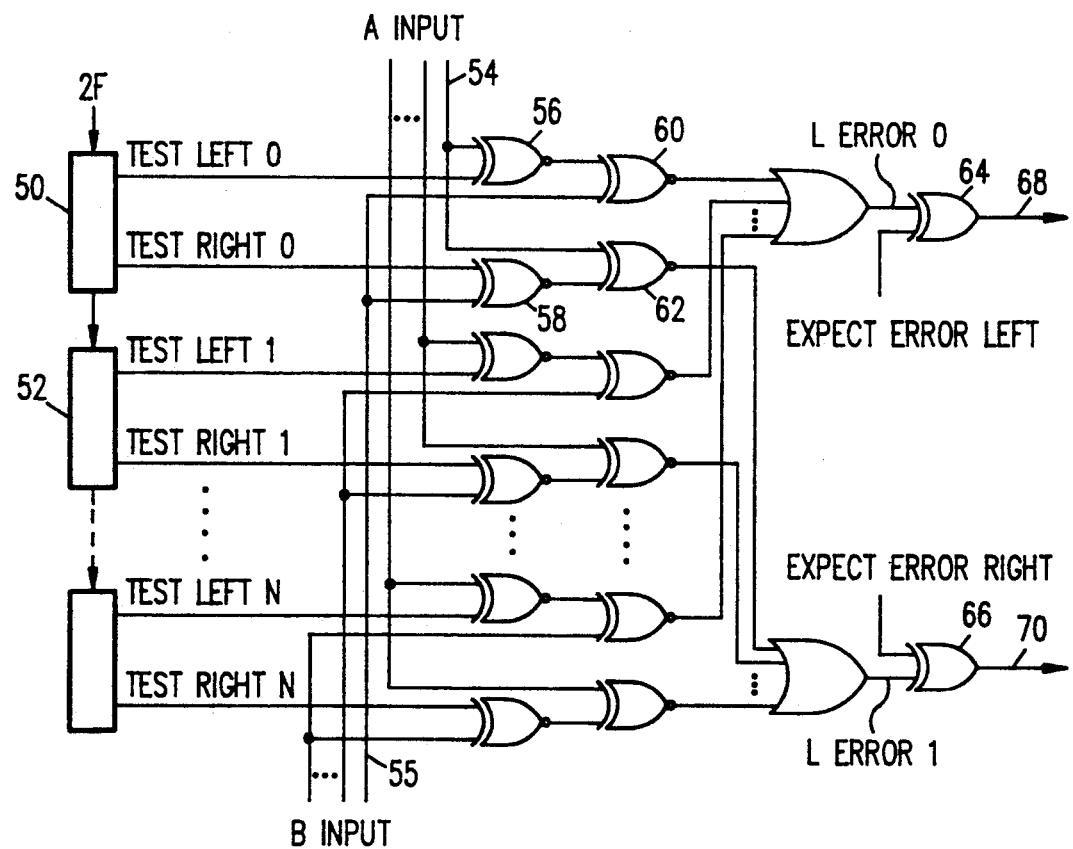
FIG. 2 is a diagram of a simple dual comparator functional redundancy checking in accordance with the present invention; and, FIG. 3, comprised of FIGS. 3A and 3B, is a diagram of a complete latent error detection logic in accordance with the present invention.

To fully check all of the transistors in the FRC tree, it is necessary to inject and test for both a logical 1 and a logical 0 to thereby corrupt each case, both during a test mode and a non-test mode. Further, during testing, the circuit must be able to concurrently test for real errors. A second comparator tree is added to do the real testing while the other tree is doing the FRC check. A very simplified version of this is shown in FIG. 2. Not shown are the register bits which are needed to hold the "test this bit" function and "expect an error in this comparator" function. There is also added a line which provides the function "expect an error in the left comparator" and a bit which provides the function "expect an error in the right comparator".

Refer now to FIG. 2. The output of the Chip A logic comprises several bits, one of which is illustrated by the single line (54). The output (54) is connected to exclusive NORs (56, 62). The outputs of the exclusive NORs (56, 58) are connected to exclusive NORs (60, 62).

The outputs of the first stage (50) of a shift chain (50, 52) drive exclusive NORs (56, 58), the outputs of which drive the inputs of exclusive NORs (60, 62). The TEST LEFT 0, TEST RIGHT 0 outputs and TEST LEFT 1 and TEST RIGHT 1 outputs provide a test pattern of one's and zeros corresponding to an error condition forced by the shift chain (50, 52).

The shift chain is driven by an appropriate recurring frequency (2F). The shift chain (50, 52) shifts a bit from one stage of the shift chain to the next so that an error is successively injected into the FRC logic every ½ clock cycle. A check can then be made by examining the ERROR DETECT outputs (68, 70) with the expected forced error condition as provided by the test circuit comprised of exclusive NOR's. That is, the erroneous bits injected into the left FRC logic should cause an error condition to be asserted on the LATENT ERROR [0] line (68) at the same time that the expected error condition is asserted at XOR (64). The erroneous bits injected into the right FRC logic should cause an error condition to be asserted on the LATENT ERROR [1] line (70) at the same time that the expected error condition is asserted at XOR (66).

The shift chain on each module affects the value of one bit at a time to force an error in that bit to test the FRC logic. Since this bit is internally corrupted an FRC error should be indicated on the corresponding FRC error detect line if the FRC logic is working correctly. If everything is functioning normally at the time an error condition is forced, the ERROR OUTPUT line (68, 70) will indicate OK. All other conditions indicate a failure in the FRC logic itself, or a disagreement between the outputs of the master module (B) and the checker module (A).

In this circuit where more than one bit is being FRCd, the shift register has a pattern of all logic "0s" and a single logic "1." The bit with the logic "1" is the bit with the injected error which propagates through the logic. At component reset, the shift register is set to 100 . . . 000. As it is shifted it successively forces an error at each comparator tree.

Figure 3A:
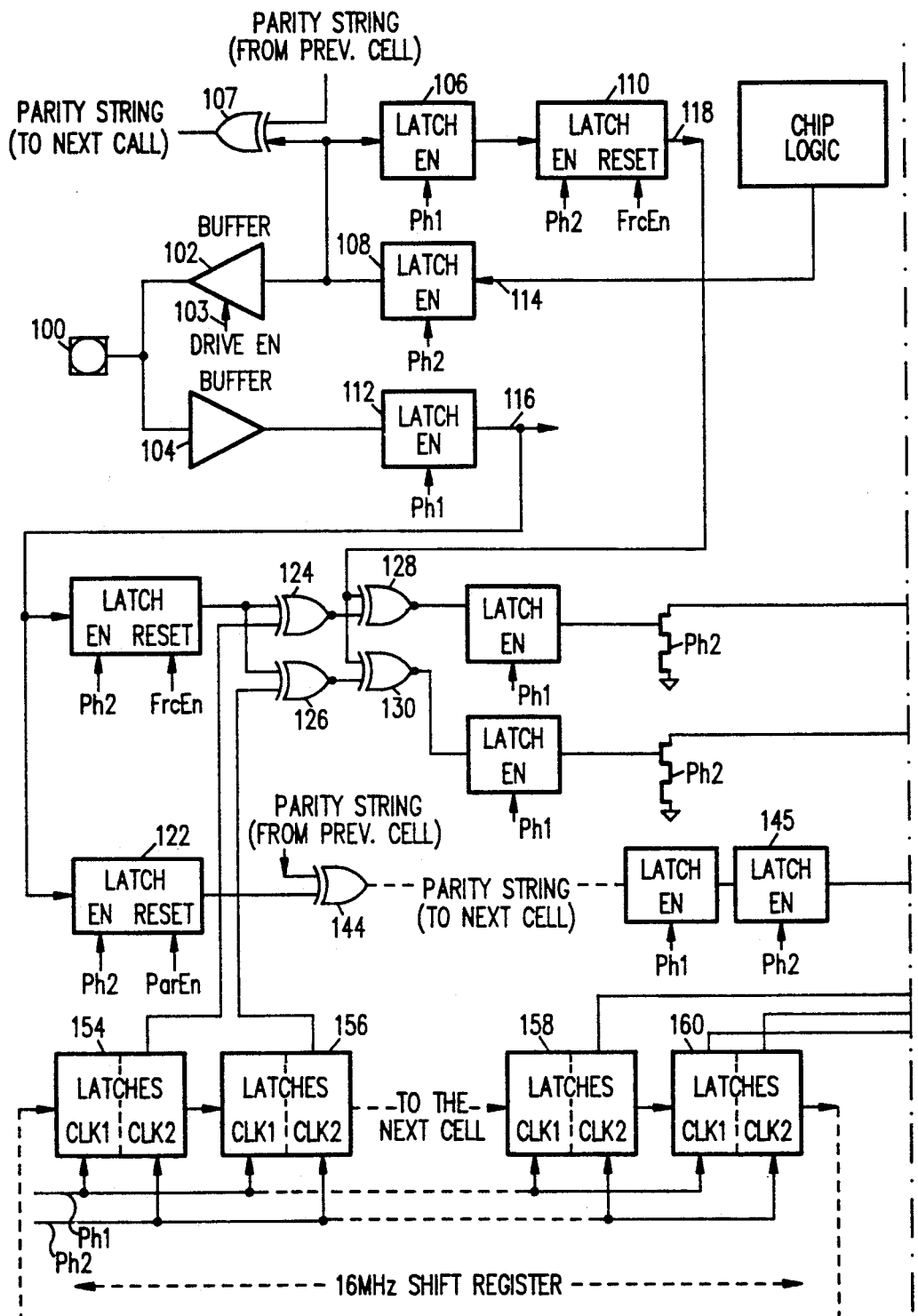
Figure 3B:
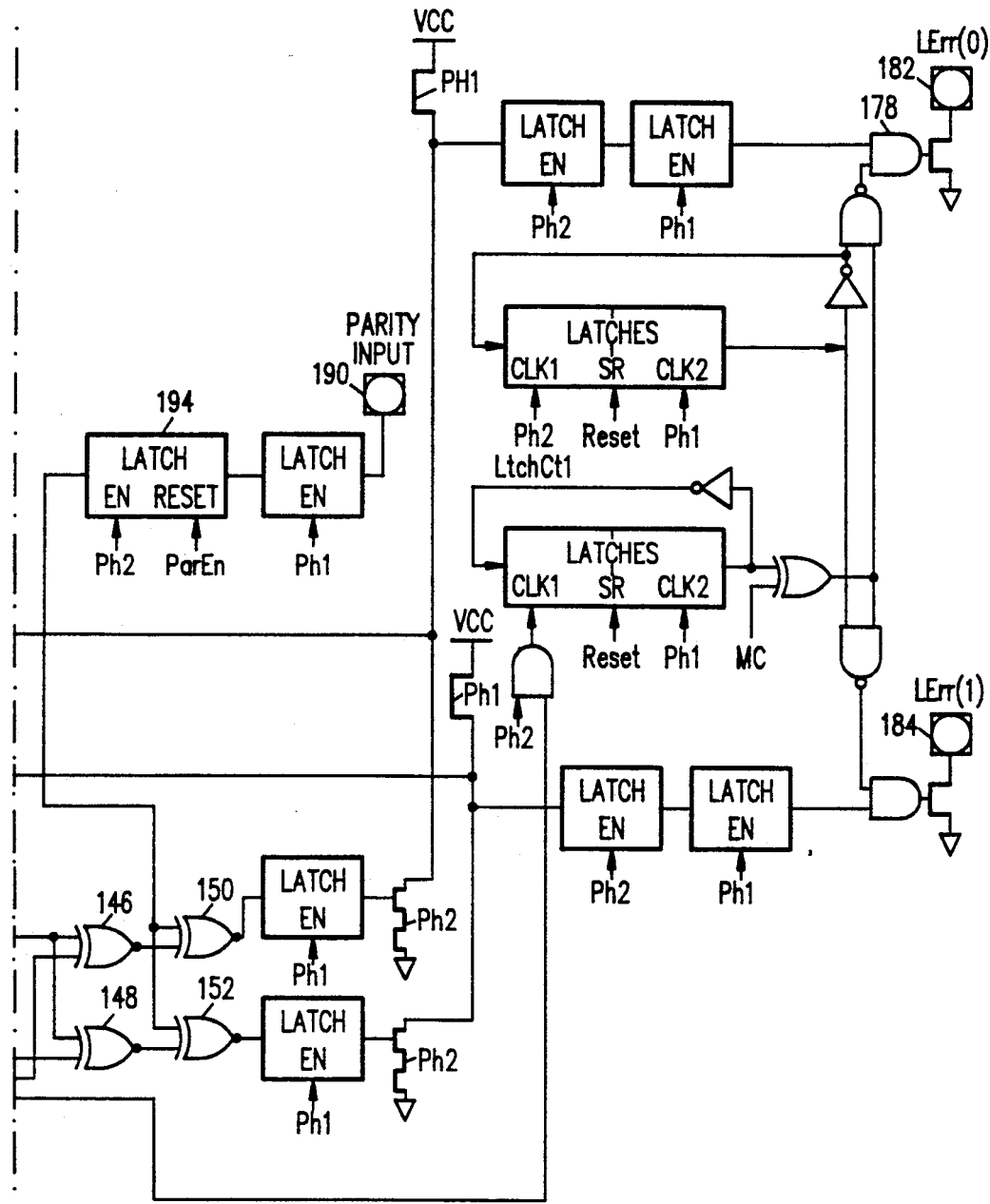

Refer now to FIG. 3 which is a diagram of a complete latent error detection logic in accordance with the present invention. Data (114) received from internal logic on the chip is latched (108) at the output and driven to the output pin (100) if an output buffer (102) is enabled by the Drive Enable line (103). The output of latch (108) is delayed by a latch (106) which drives a latch (110) to provide a delayed version (118) of the output data. The following cycle data from another chip received at an input buffer (104) connected with the output pin (100) and latched in a latch (112) is compared to the internally delayed version (118) of the value driven to the output buffer (102). This circuit detects any buffer failures, or an external short to ground or short to supply voltage Vcc.

Error detection logic to verify that the error logic itself is working correctly is accomplished by providing two sets of parity trees and two sets of FRC logic. An error is injected by the shift chain (154, 156) into one of the sets of FRC logic or into one parity tree each clock cycle. The next cycle an error is injected into the other set. The injected errors are propagated to one of two error pins (182, 184). If no errors are occurring, these pins will never be driven concurrently to the same value and should toggle value each clock cycle. The error injection provided by the shift register is done by a 1 bit which shifts past each tested pin. The length of the shift register changes if FRC or parity is disabled in order to verify the checking logic.

The logic for checking two identical modules can be disabled by not asserting the Drive Enable input (103). This prevents the data from reaching the output pin (100). However, unlike the prior art circuit, the present invention allows the check logic to self-check the operation of the internal chip logic even when the module is not part of an FRC pair. Data (114) received from internal logic on the chip is latched (108) at the output and driven to the output pin (100) if output buffer (102) is enabled by the Drive Enable line (103). The output of latch (108) is delayed by a latch (106) which drives a latch (110) to provide a delayed version (118) of the output data. The following cycle the same data from latch (108) is received at an input buffer (104) connected to the output pin (100) and is latched in latch (112). The output of latch (112) is compared to the delayed version (118) of the value driven to the output buffer (102). This circuit will therefor detect any buffer failures, and an external short to ground or short to supply voltage Vcc.

The output (118) is connected to exclusive NORs (128, 130). The outputs of the first stage (154, 156) of a shift chain drive exclusive NORs (124, 126), the outputs of which drive the inputs of exclusive NORs (128, 130). The outputs of the first stage (154, 156) provide a test pattern of one's and zeros corresponding to an error condition forced by the shift chain.

The shift chain is driven by the system clock, which is comprised of two phases, Ph1 and Ph2, for each clock cycle. The shift chain shifts a bit from one stage of the shift chain to the next so that an error is successively injected into the FRC logic every clock cycle. A check can then be made by examining the ERROR DETECT outputs (182, 184) with the expected forced error condition as provided by the test circuit comprised of exclusive NOR's. That is, the erroneous bits injected into the left FRC logic should cause an error condition to be asserted on the LATENT ERROR [0] line (182) at the same time that the expected error condition is asserted at exclusive NOR (128). The erroneous bits injected into the right FRC logic should cause an error condition to be asserted on the LATENT ERROR [1] line (184) due to the injected error condition asserted at exclusive NOR (130).

The shift chain on each module affects the value of one bit at a time to force an error in that bit to test the FRC logic. Since this bit is internally corrupted an FRC error should be indicated on the corresponding FRC error detect line if the FRC logic is working correctly. If everything is functioning normally at the time an error condition is forced, the ERROR OUTPUT lines will indicate OK. All other conditions indicate a failure in the FRC logic itself, or a disagreement between the outputs of the master module (B) and the checker module (A).

In this circuit where more than one bit is being FRCd, the shift register has a pattern of all logic "0s" and a single logic "1." The bit with the logic "1" is the bit with the injected error which propagates through the logic. At component reset, the shift register is set to 100 . . . 000. As it is shifted it successively forces an error at each comparator tree.

Parity Latent Error Detect

A similar "dual comparator with shift register" described above for checking the FRC logic is used in FIG. 3 to check the parity check circuits. This enables complete on-line parity logic testing by injecting errors with the same shift register used to inject errors into the FRC logic.

Data (114) received from internal logic on the chip is latched (108) at the output and driven to the exclusive or (107), which is part of the circuit that generates the parity to be driven on the parity pin. The value from the input buffer (104) is delayed by a latch (122) which drives the first exclusive or (144) of a parity string. The following cycle data from another chip received at a parity input pin (190) is latched in a latch (194) is compared to the internally delayed version (145) of the value driven to the parity string.

Error detection logic to verify that the parity error logic itself is working correctly is accomplished by providing two sets of parity logic. An error is injected by the shift chain (151, 156) into one of the sets of parity error detection logic each clock cycle. The next cycle an error is injected into the other set. The injected errors are propagated to one of two error pins (182, 184). If no errors are occurring, these pins will never be driven concurrently to the same value and should toggle value each clock cycle. The error injection provided by the shift register is done by a 1 bit which shifts past each tested pin. The length of the shift register changes if FRC or parity is disabled in order to verify the checking logic.

The parity input pin (190) is connected to exclusive NORs (150, 152). The outputs of the last stage (158, 160) of the shift chain drive exclusive NORs (146, 148), the outputs of which drive the inputs of exclusive NORs (150, 152). The outputs of the last stage (158, 160) provide a test pattern of one's and zeros corresponding to an error condition forced by the shift chain.

The shift chain is driven by the system clock, which is comprised of two phases, Ph1 and Ph 2, for each clock cycle. The shift chain shifts a bit from one stage of the shift chain to the next so that an error is successively injected into the parity logic every clock cycle. A check can then be made by examining the ERROR DETECT outputs (182, 184) with the expected forced error condition as provided by the test circuit comprised of exclusive NOR's. That is, the erroneous bits injected into the left parity logic should cause an error condition to be asserted on the LATENT ERROR [0] line (182) due to the error condition is asserted at XOR (128). The erroneous bits injected into the right parity logic should cause an error condition to be asserted on the LATENT ERROR [1] line (184).

The shift chain on each module affects the value of one bit at a time to force an error in that bit to test the parity logic. Since this bit internally corrupts the parity, an error should be indicated on the corresponding parity error detect line if the parity logic is working correctly. If everything is functioning normally at the time an error condition is forced, the ERROR OUTPUT lines will indicate OK. All other conditions indicate a failure in the parity logic itself, or a disagreement between the outputs of the master module (B) and the checker module (A).

In this circuit where more than one bit is being checked, the shift register has a pattern of all logic "0s" and a single logic "1." The bit with the logic "1" is the bit with the injected error which propagates through the logic. At component reset, the shift register is set to 100 . . . 000. As it is shifted it successively forces an error at each comparator tree.

While the invention has been particularly shown and described with reference to a preferred embodiment thereof, it will be understood by those skilled in the art that various changes in form and detail may be made therein without departing from the scope of the invention.

What is claimed is:

1. In an integrated circuit module having chip logic fabricated thereon said chip logic having a chip logic data output an error checking circuit comprising:

a clock pulse source for generating a first clock pulse output each one-half cycle of a full clock cycle;

an output pin;

first compare circuit having a first input and a second input for providing a first compare output upon the condition that said first and second inputs do not match;

a second compare circuit having a third input and a fourth input for providing a second compare output upon the condition that said third and fourth inputs do not match;

an output buffer connected to said output pin and to said chip logic data output for providing an output signal to said output pin;

said output buffer being activated by a drive enable;

a delay circuit connected to said chip logic data output and to said first input of said first compare circuit and to said third input of said second compare circuit for delaying said chip logic data by one clock cycle to thereby provide a delayed chip logic data output at a delayed signal output of said delay circuit;

means for connecting said output pin to said second input of said first compare circuit and to said fourth input of said second compare circuit; and, a shift register connected to said first clock pulse output for generating successively with each shift of said shift register a test left signal and one half clock cycle subsequent to said test left signal a test right signal;

said test signal of said shift register means being connected to said first comparator to thereby inject an error signal into said first comparator;

said test right signal of said shift register means being connected to said second comparator to thereby inject an error signal into said second comparator.

2. The combination in accordance with claim 1 further comprising:

means for resetting said shift register to a predetermined initial test pattern.

* * * * *